(12) United States Patent
Li (10) Patent No.: US 9,607,347 B1
(45) Date of Patent: Mar. 28, 2017

(54) SYSTEMS AND METHODS OF 3D SCANNING AND ROBOTIC APPLICATION OF COSMETICS TO HUMAN

(71) Applicant: Qiang Li, Los Altos, CA (US)

(72) Inventor: Qiang Li, Los Altos, CA (US)

(*) Notice: Subject to any disclaimer, the term of this patent is extended or adjusted under 35 U.S.C. 154(b) by 0 days.

(21) Appl. No.: 14/846,000

(22) Filed: Sep. 4, 2015

(51) Int. Cl.
| | |
|---|---|
| H04N 5/225 | (2006.01) |
| G06T 1/00 | (2006.01) |
| H04N 5/232 | (2006.01) |
| H04N 13/02 | (2006.01) |
| G06T 7/00 | (2017.01) |
| B25J 15/00 | (2006.01) |
| B25J 9/00 | (2006.01) |
| B25J 9/16 | (2006.01) |
| A45D 44/00 | (2006.01) |
| A45D 40/26 | (2006.01) |

(52) U.S. Cl.
CPC ............ *G06T 1/0014* (2013.01); *A45D 40/26* (2013.01); *A45D 44/005* (2013.01); *B25J 9/0003* (2013.01); *B25J 9/1664* (2013.01); *B25J 15/0019* (2013.01); *G06T 7/0055* (2013.01); *H04N 5/23229* (2013.01); *H04N 13/0271* (2013.01); *G06T 2207/10012* (2013.01); *G06T 2207/30201* (2013.01); *Y10S 901/09* (2013.01)

(58) Field of Classification Search
None
See application file for complete search history.

(56) References Cited

U.S. PATENT DOCUMENTS

| | | | |
|---|---|---|---|
| 7,648,364 B2 | 1/2010 | Dauga et al. | |
| 8,464,732 B2 | 6/2013 | Wong | |
| 8,899,242 B2 | 12/2014 | Wong | |
| 8,915,562 B2 | 12/2014 | Edgar et al. | |
| 2012/0067364 A1* | 3/2012 | Wong | A45D 44/005 132/200 |
| 2012/0158184 A1* | 6/2012 | Ma | B25J 9/1679 700/264 |
| 2012/0189186 A1* | 7/2012 | Csulits | G07D 7/0033 382/135 |

(Continued)

OTHER PUBLICATIONS

Rjwilmsi et al, Structured-light 3D scanner, Wikipedia article (2015).

(Continued)

*Primary Examiner* — Stephen Coleman
(74) *Attorney, Agent, or Firm* — Robert Moll (57) ABSTRACT

Systems and methods for applying cosmetics are provided using an incoherent light projector shining light on the face, capturing the reflected light using a camera and the projector, communicating with the camera and the projector and a structured light depth processor to generate a depth image output. A control device communicates with the structure light depth sensor to receive the output, to receive the face profiles and generate motion trajectory commands, and a robot communicates with the control device to receive the commands to apply the cosmetics to the face in accordance with the face profiles. Methods for applying the cosmetics include receiving a face profile, receiving a depth sensor input representing a face, extracting face features, matching the face profile to the face features, and generating a guide or outputting robot trajectory to apply the cosmetics.

20 Claims, 6 Drawing Sheets

(56) References Cited

U.S. PATENT DOCUMENTS

| | | |
|---|---|---|
| 2013/0216295 A1 | 8/2013 | Wong |
| 2014/0161507 A1 | 6/2014 | Wong |
| 2014/0174463 A1 | 6/2014 | Wong |
| 2014/0176706 A1 | 6/2014 | Wong |
| 2015/0092073 A1* | 4/2015 | Park .................. H04N 5/232 348/218.1 |

OTHER PUBLICATIONS

The OpenCV Reference Manual, Release 2.4.10.0 (2014).
Kavraki Lab, Open Motion Planning Library: A Primer, Rice University (2014).
Sorour et all, Development of Roller-Based Interior Wall Painting Robot, World Academy of Science, Engineering and Technology vol. 5 Nov. 27, 2011.
Micro-Epsilon company, automationCONTROL Robot painting with ATENSOR LS1-Technology, (2015).
Tarquin et al, Cosmetics, Wikipedia article (2015).
Damian et al, Touch Screen, Wikipedia article (2015).

\* cited by examiner

SYSTEMS AND METHODS OF 3D SCANNING AND ROBOTIC APPLICATION OF COSMETICS TO HUMAN

BACKGROUND

The invention relates to systems and methods for three-dimensional (3D) scanning and robotic application of cosmetics to humans.

Today, many women and men are using decorative and care cosmetics. Cosmetics can be liquid, cream, emulsions, pressed and loose powders, and dispersions. The FDA that regulates use of cosmetics in the United States says that cosmetics are substances applied to the human body "for cleansing, beautifying, promoting attractiveness, or altering the appearance without affecting the body's structure or functions." Some examples of cosmetics include skin creams, lotions, powders, lipsticks, perfumes, fingernail and toe polish, eye and facial makeup, hair color or spray. For additional details, see Wikipedia *Cosmetics* (2015), which is incorporated by reference herein.

Decorative cosmetics used to improve the user's appearance are often referred to as makeup or make-up. Typically, the wearer of the makeup will apply it to their facial features (e.g., eyebrows, cheeks, or nose) in an elaborate painstaking fashion. Because of the need to safely apply cosmetics on the face, eye area are usually applied by hand either with a makeup tool such as a brush, sponge, or the fingertips.

Many cosmetics are applied by a finger, a hand or a tool such as sponge held by a hand. Primers are applied using a finger used to reduce pore size, extend wear and permit smooth application of makeup. Lipstick is usually applied with a brush to add color and texture to the lips. Lip gloss adds shine and color. Lip balm moisturizes and protects the lip. Concealer is often applied by finger and is thicker and more solid than foundation and can be used to cover imperfections and contour the nose, cheeks, and jaw. Foundations again are applied with a finger in moist powder, liquid, and spray form smooth imperfections and help makeup last longer. Rouge or blush are often brushed on as a moist powder, cream, and liquid forms can color and define cheeks. Highlights are applied using a finger and can be used to accent facial features. Bronzer can add tan color, glow, and shimmer. Mascara can darken, lengthen, thicken, and draw attention to eyelashes. Eyeliner and eyebrow pencils can enlarge the appearance of eyes and eyebrows.

Although people refer to beauty advisers at retailers and magazines for the latest style, they apply cosmetics by hand daily or at intervals will splurge and hire a makeup professional or cosmetician to advise and provide facial and body treatments for clients. Daily application by a professional is usually expensive.

SUMMARY OF THE INVENTION

In a feature of the invention, a system is used to apply cosmetics to a face in accordance with face profiles, including an incoherent light projector for shining spatial varying light to the face, at least one camera spaced from the face and the incoherent light projector to capture reflected light from the face, a structured light depth processor to communicate with the camera and the projector and to generate an depth image output, a control device that communicates with the structured light depth processor to receive the depth image output, to receive the face profiles, and to generate a plurality of motion trajectory commands, and a robot with an applicator, wherein the robot communicates with the control processor to receive the motion trajectory commands to apply the cosmetics with the applicator to the face in accordance with the face profiles.

In another feature of the invention, a method is performed in a control device of controlling a robot that applies cosmetics to a face, comprising: (a) receiving a face profile; (b) receiving a depth processor input representing a face; (c) extracting a plurality of features of the face; (d) extracting a robot position with respect to the face from the depth sensor input; (e) matching the face profile of step (a) to the features of step (c); (f) generating robot trajectory based on steps (d) and (e); (g) outputting the robot trajectory to the robot to apply the cosmetics; and (h) repeating steps (b) to (g).

In still another feature of the invention, a method performed in a control device of displaying guides that show how to apply cosmetics to a face by hand, comprising the steps of: (a) receiving a face profile; (b) receiving a depth sensor input representing a face; (c) extracting a plurality of features of the face; (d) matching the face profile of step (a) to the features of step (c); (e) generating guides to apply cosmetics; and (f) outputting the guides on the face to a display.

DETAILED DESCRIPTION OF THE PREFERRED EMBODIMENTS

The following description includes the best mode of carrying out the invention. The detailed description illustrates the principles of the invention and should not be taken in a limiting sense. The scope of the invention is determined by reference to the claims. Each part (or step) is assigned its own part (or step) number throughout the specification and drawings. The method drawings illustrate a specific sequence of steps, but the steps can be performed in parallel and/or in different sequence to achieve the same result.

Figure 1:
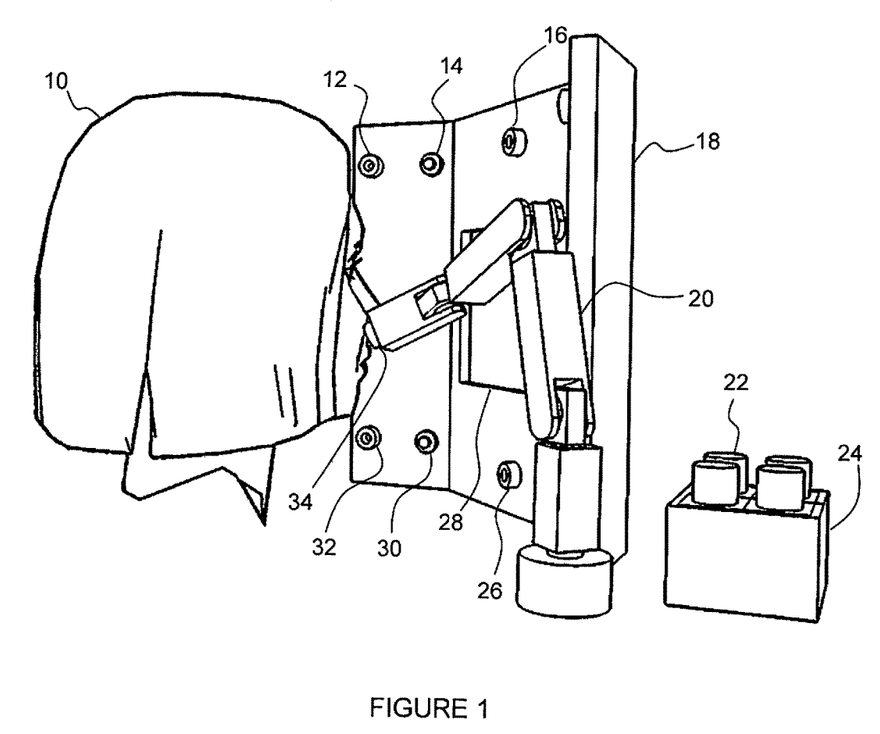
FIG. 1 illustrates a user and an embodiment of the system where the user has no head rest.

FIG. 1 illustrates an embodiment of the system that employs 3D scanning to register the location of facial features. A user's head 10 is oriented so the face is in front of an incoherent light projector 14 that bathes the user's face in spatially varying light. Some of that light reflects from the user's face to a camera 12 and a camera 16 that provide information that tells in 3D the facial features. In operation, ambient light is reduced (e.g., blocked or lights turned off) to a level that prevents saturation of the camera 16.

It is not essential to the invention what type of physical structure is used to support the cameras and incoherent light projectors. In the illustrated embodiment, a frame 18 with three panels is used. As shown, the frame 18 has a middle panel between left and right side panels. Each side panel forms an obtuse angle with the middle panel. The middle panel of the frame 18 supports cameras 16, 26 and a user interface 28. The left panel supports the cameras 12 and 32, and the projectors 14 and 30. The right panel supports another set of projector and camera 76 and 78 (See FIGS. 5 and 8). Alternatively, the frame could be a convex-shaped structure (not shown) that supports and orients the cameras and the projectors toward the user's face.

A robotic arm 20 communicating with a control device 42 (FIG. 2) will controllably apply the decorative or care cosmetics (for brevity I refer to both types of cosmetics as makeup in the application) to the user's face based on face profiles stored in the control device and the information from the 3D scanning that will be described in detail below.

Figure 2:
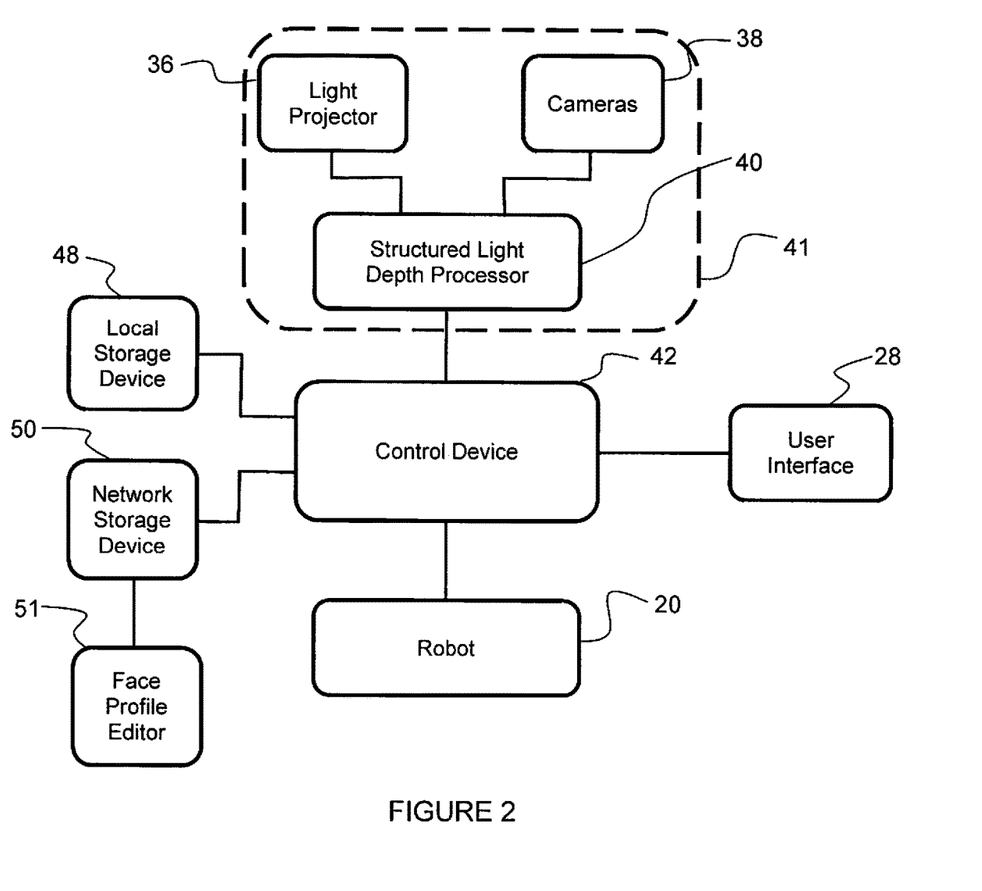
FIG. 2 illustrates hardware architecture of an embodiment of the system.

FIG. 2 illustrates a hardware architecture that implements an embodiment of the system. A control device 42 includes a computer that can communicate with other hardware, computers and data storage. Hennessy and Patterson, *Computer Architecture: A Quantitative Approach* (2012), and Patterson and Hennessy, *Computer Organization and Design: The Hardware/Software Interface* (2013), which are incorporated by reference herein, describe computer hardware and software, storage systems, caching, and networks.

The processors used in the control device 42 are not essential to the invention and could be any general-purpose processor (e.g. Intel Xeon), a graphic processor (GPU). Each processor can read and write data to memory and/or through a link, e.g., Fibre Channel (FC), Serial ATA (SATA), Serial attached SCSI (SAS), Ethernet, Wi-Fi, to a local storage device 48 or to a network accessible storage device 50. The storage devices can be a hard disk drive, a disk array, and/or solid state disk. In an embodiment, the network storage device 50 permits the face profiles to be accessed and/or edited by face profile editor 51 over the Internet. The control device 42 controls and communicates with a robot 20, a user interface 28, and a structured light depth sensor 41 through USB, Wi-Fi, or Ethernet. The control device 42 executes an operating system such as Linux or Windows.

In an embodiment, a suitable part for the control device 42 and the storage device 48 is Centaurus Rogue2 Gaming Computer manufactured by Centaurus Computer at 6450 Matlea Court, Charlotte, N.C. 28215. For additional details see www.centauruscomputers.com.

Figure 8:
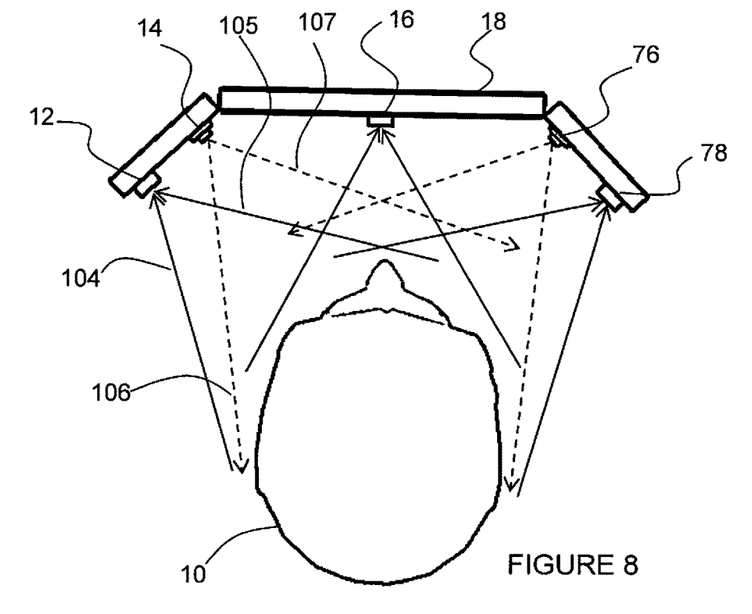
FIG. 8 illustrates the operation of the depth sensing using cameras and incoherent light projectors.

The structured light depth sensor 41 includes a number of light projectors 36, a number of cameras 38 and a structured light depth processor 40. FIG. 8 further describes the structured light depth sensor 41. The structured light depth processor communicates with at least one incoherent light projector 36 through USB or VGA and at least one camera 38 through the Mobile Industry Processor Interface (MIPI) specification described in *MIPI Alliance Standard for Camera Serial Interface CSI*-2, which is incorporated by reference herein, or other camera interfaces such as Camera Link® or USB. The structured light depth processor 40 may execute a real time operating system (RTOS) such as Wind River, Nucleus, μCOS or another suitable operating system.

In an embodiment, a suitable part for the structured light depth processor 40 is the Zyng7000 FPGA manufactured by Xilinx, Inc. at 2100 Logic Drive, San Jose, Calif. 95124.

In an embodiment, a suitable part for the incoherent light projector 36 is the HW8G3 Pico Engine, manufactured by Imagine Optix at 10030 Green Level Church Road, Suite 802-1260, Cary, N.C. 27519. For additional details see www.imagineoptix.com and http://www.picoprojector-info.com.

In an embodiment, a suitable part for the camera 38 is the LI-VM01CM manufactured by Leopard Imaging Inc. at 1130 Cadillac Court, Milpitas, Calif. 95035.

In an embodiment, a suitable part for the robot 20 is the Lynxmotion model AL5D 4DOF robotic arm manufactured by Lynxmotion, a RobotShop Inc. company, at 555 VT Route 78 Suite 367, Swanton, Vt. 05488. RobotShop Inc. is in Mirabel, Quebec, Canada. For additional details see www.robotshop.com.

In an embodiment, a suitable part for the user interface 28 is a touch display such as ME176CX manufactured by ASUS at 800 Corporate Way, Fremont, Calif. 94539. Additional details about implementation of touch screens are described in Wikipedia *Touchscreen* (2015), incorporated by reference herein.

Figure 3:
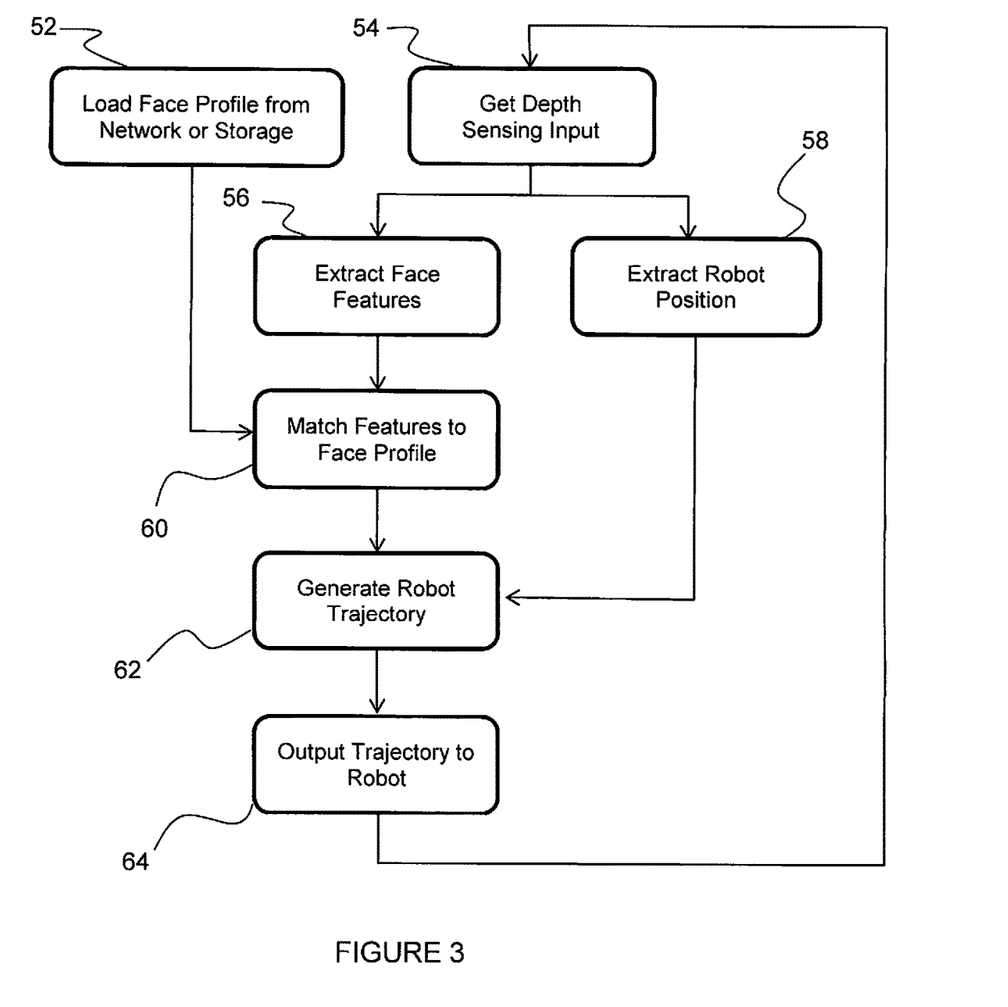
FIG. 3 illustrates a method of control for a system using a feedback loop.

FIG. 3 illustrates a method that the control device 42 of FIG. 2 is configured to perform using a feedback loop. At step 52 the control device 42 loads at least one face profile from local storage device 48 or the network storage device 50. At step 54, the control device 42 will get depth sensor input from the structured light depth sensor 41. At step 58, the control device 42 will extract the position of the robot 20. At step 56, in parallel or serially with respect to step 58, the control device 42 extracts the face features obtained by the structured light depth sensor 41. At step 60, the control device 42 will match the face features obtained at step 56 with the face profile obtained at step 52. The OpenCV Reference Manual—Release 2.4.10.0 at pages 426-427 (2014), describes a suitable extraction and tracking (i.e., matching) algorithm known as the Fast Retina Keypoint (FREAK) algorithm (hereinafter "the OpenCV manual"), which is incorporated by reference. At step 62, the control device 42 will generate the trajectory of the robot 20. The algorithm for step 62 can be based on a painting algorithm described in World Academy of Science, Engineering and Technology Vol: 5 2011-11-27, "Development of Roller-Based Interior Wall Painting Robot" or constructed from the Open Motion Planning Library as discussed in Open Motion Planning Library: A Primer Dec. 22, 2014, which are incorporated as reference herein. At step 64, the control device 42 will output the trajectory of step 62 to the robot 20, and return (i.e., the feedback loop) to step 54 to repeat the method of FIG. 3.

Figure 4:
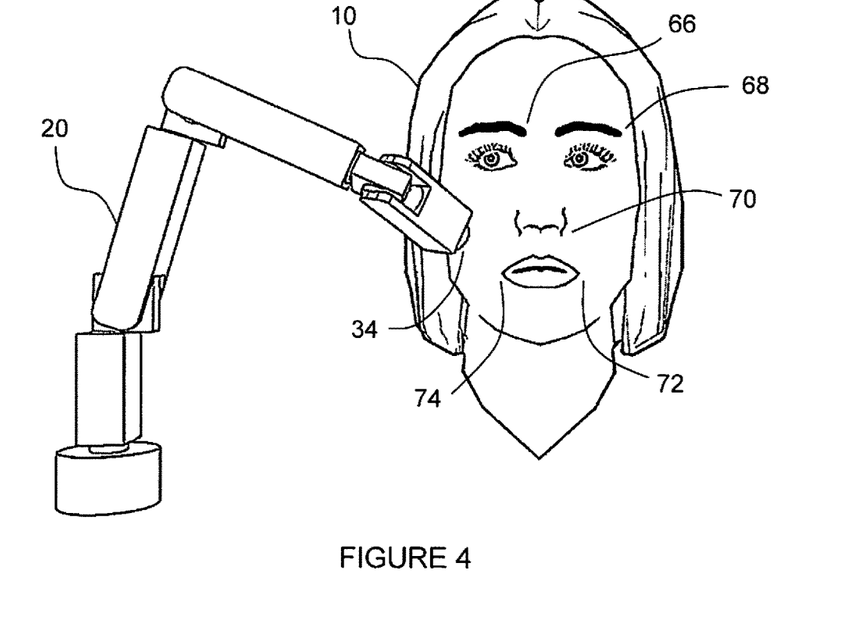
FIG. 4 illustrates a user and an embodiment of the system without showing the frame.

FIG. 4 illustrates the front view of the face while the robotic arm 20 is applying the makeup to the user's face. Using the input from the structured light depth sensor 41, the control device 42 will extract a set of feature points (e.g., feature points 66, 68, 70, 72, and 74) for positioning. The feature points are small unique areas in term of shape and color on the face. For example, the end of the eyebrows (e.g., feature point 68), the corner of the nose (e.g., feature point 70), or the end of the lip ((e.g., feature point 72 and 74) are feature points that can be uniquely identified and located in a face profile. In an embodiment, the control device 42 (FIG. 2) will use feature points to align the loaded face profile to the user's face for accurate application of makeup either at an initial position or preferably frame by frame. In an embodiment, additional feature points beyond those illustrated in FIG. 4 is extracted to form a 3D representation of the face.

Figure 5:
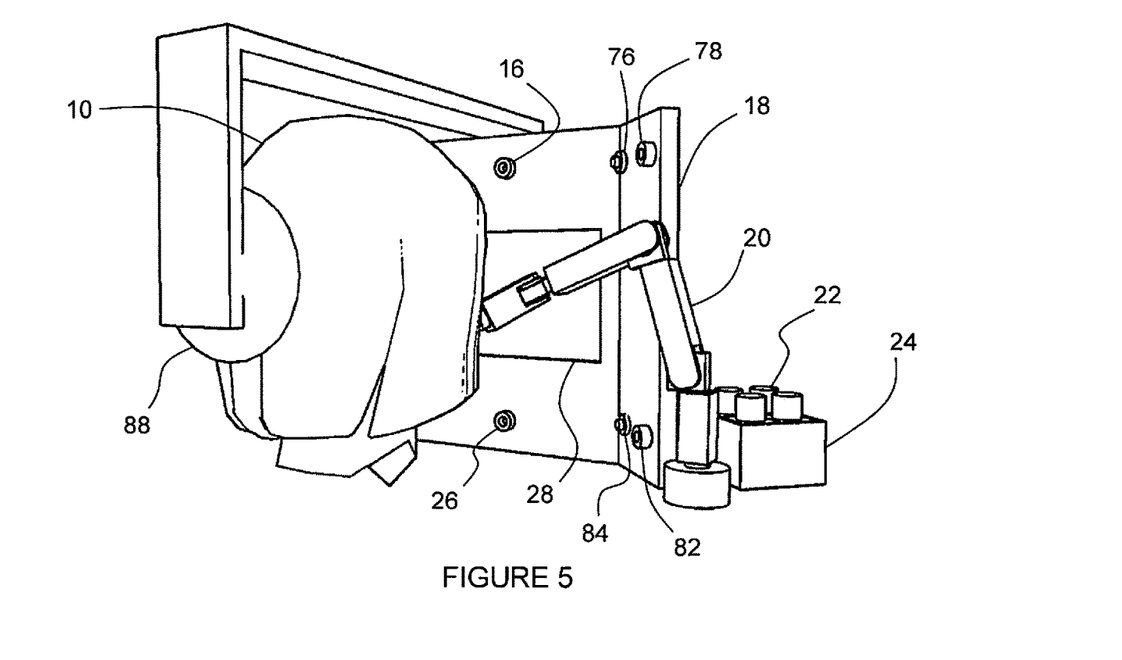
FIG. 5 illustrates a user and an embodiment of the system where the user has a head rest.

FIG. 5 illustrates a system that implements a second embodiment of the invention, which has a head rest 88. This is the same setup up as in FIG. 1 with the exception of head rest. When using the head rest, the control device can use the algorithm in FIG. 3 without the step 58. The face profile is captured at the beginning of the operation. Once the application starts, the robot completes the operation without further command from the control device.

Figure 6:
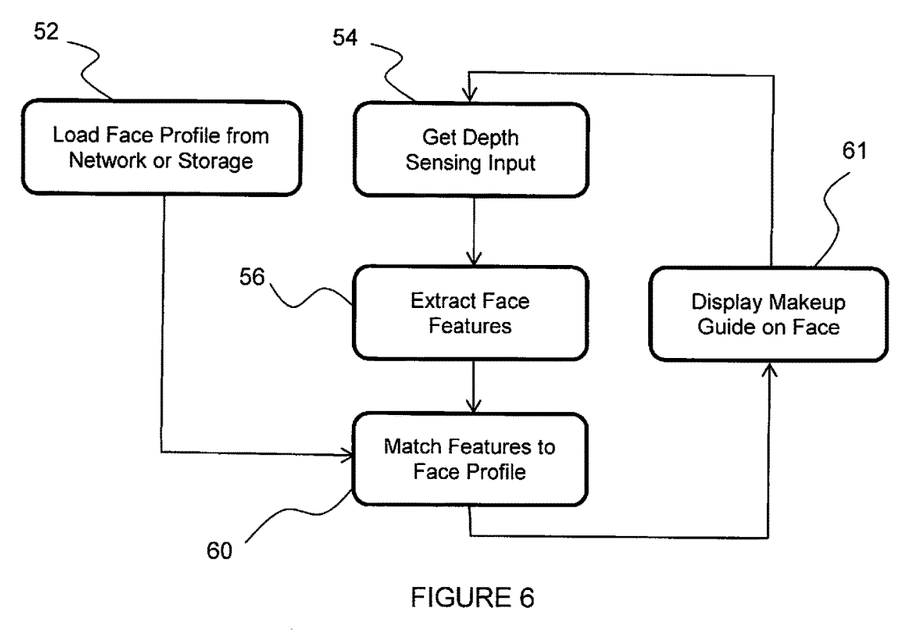
FIG. 6 illustrates a method of control for a system displaying guides to apply cosmetics.
Figure 9:
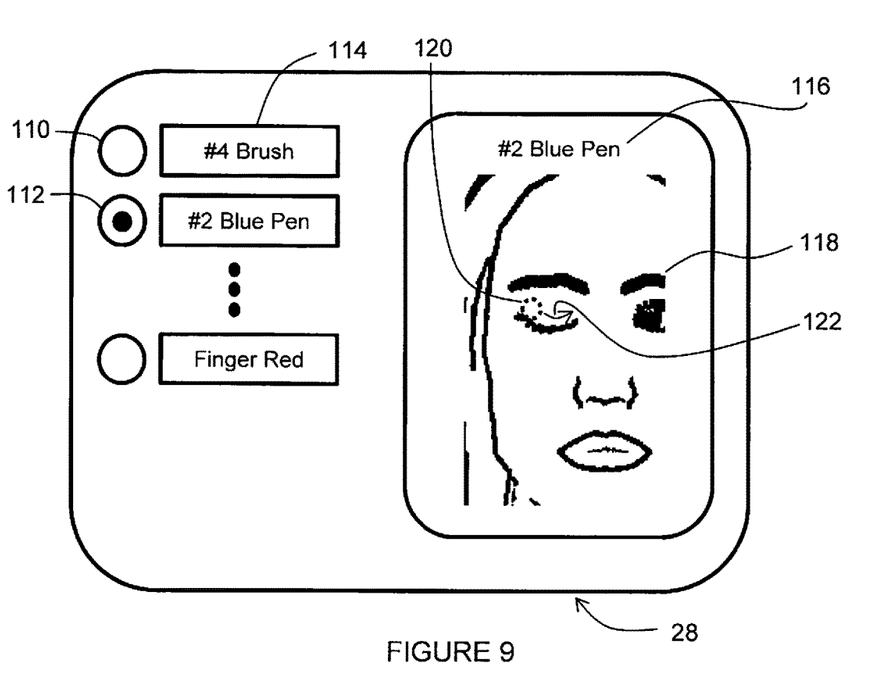
FIG. 9 illustrates a user interface that displays makeup guides and allows selection of cosmetic applicators.

FIG. 6 illustrates a method performed in a control device 42 of FIG. 2 for displaying guides to apply makeup by hand. At step 52, the control device 42 loads a face profile from local storage device 48 or network storage device 50. At step 54, the control device 42 then captures the face profile from the depth sensor 41. Using the input obtained at the step 54, the control device 42 extracts the facial feature points. The algorithm for feature extraction and matching is the same as described in the specification of FIG. 3 and in the OpenCV manual, which is incorporated by reference herein. At step 60, the control device 42 matches the feature points obtained in step 52 with the feature points obtained in step 54. At step 61, the control device 42 generates and displays a makeup guide 122 (FIG. 9) on the face to show where to apply the makeup. When the user brings an applicator within the field of view of at least one camera, an applicator location 120 (e.g., a circle or fingertip) is displayed on the face as shown in FIG. 9. The control device 42 then continues at step 54.

Figure 7:
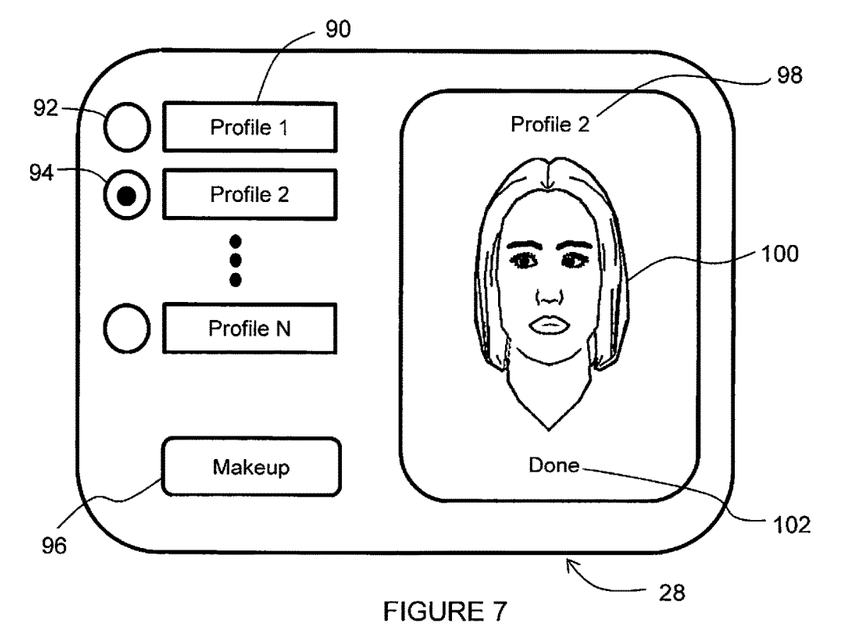
FIG. 7 illustrates a user interface that displays and allows selection of face profiles for application of cosmetics.

FIG. 7 illustrates the user interface 28 in FIG. 2, which is a computer implemented touch screen or GUI that displays face profiles with selectable buttons to permit the user to select which face profile to use for application of makeup. Face profile names 90 are shown. Selection buttons 92 are adjacent to the profile name. Once a user selected a profile 94, that profile name 98 and the face profile 100 are shown. Then the user starts the application by clicking on the makeup button 96. When the application is complete, the done message 102 is displayed.

FIG. 8 illustrates the operation of the depth sensing using cameras and incoherent light projectors. The high resolution depth profile of the face can be acquired by using the incoherent light projectors 14 and 76 with projected area as represented by dotted lines 106 and 107, and using the cameras 12, 16 and 78 with the field of view of camera 12 represented by the solid lines 104 and 105. Multiple lights from the projectors 14 and 76 can shine on the face. Multiple cameras 12, 16, and 78 acquire images of the face simultaneously. The structured light pattern from the incoherent light projector varies in space as well as in time. For example, a black and white stripe pattern may shift (e.g., left to right) across the field of view in time. The reflection of the face of the head 10 will show varying light intensity. In an embodiment, the light intensity on the face is captured by at least two cameras. Correlations between the pixels of the camera(s) are obtained. In another embodiment, the light intensity on the face is captured by at least one camera. Correlations between the pixels of the camera and the projector are obtained. In either embodiment, from the correlation the distance of the face from the camera can be calculated through triangulation. For additional details, see Wikipedia *Structured Light 3D Scanner* (2015), which is incorporated by reference herein.

FIG. 9 illustrates in an embodiment the user interface 28 (FIG. 2) displays face profiles with selectable buttons 110 to permit the user to select a makeup applicator 114. Once the user selects applicator button 112 as shown, the interface 28 displays an applicator name 116 (e.g., #2 Blue Pen), a face profile 118, and a makeup guide 122. The user starts applying makeup following the makeup guide 122. When the applicator is within the field of view of at least one of the cameras, the applicator location 120 is shown on the face in the display. The user moves the applicator to follow the makeup guide 122 to apply the makeup. User can then select the next makeup applicator (e.g., #4 Brush) to continue.

What is claimed:

1. A system for applying cosmetics to a face in accordance with face profiles, comprising:
    a structured light depth sensor that captures a 3D representation of the face frame by frame comprising:
        an incoherent light projector configured to bath the face in spatial varying light to the face,
        a camera spaced from the face and the incoherent light projector configured to capture some of the reflected light from the face, and
        a structured light depth processor configured to execute a real time operating system and communicate with the camera and the projector and to generate a depth image output;
    a control device configured to communicate with the structured light depth processor to receive the depth image output, to receive a face profile, and to generate a plurality of motion trajectory commands; and
    a robot configured to communicate with the control device to receive the motion trajectory commands to apply the cosmetics to the face in accordance with the face profile.

2. The system of claim 1, further comprising a storage device configured to communicate with the control device to store the face profiles and a user interface configured to display face profile(s) that can be selected by the user as the face profile.

3. The system of claim 1, further comprising a network storage device is configured to permit the face profiles to be accessed and/or edited by third parties and users over the Internet.

4. The system of claim 1, further comprising a head rest for keeping the face stationary during the time the robot is applying the cosmetics to the face.

5. The system of claim 1, wherein each of the face profiles includes a 3D model that represents the face and a cosmetics design that assigns at least one color value to the 3D model.

6. The system of claim 1, further comprising enclosures and lighting to control the illumination on the face from ambient light to limit saturation of the camera.

7. The system of claim 1, wherein the robot includes an applicator comprising a nozzle, a brush, or a pen.

8. The system of claim 1, wherein the robot is configured to change the type of applicator to meet the requirements of the face profile.

9. The system of claim 1, further comprising displaying the cosmetics designs and selecting one of the cosmetics designs to apply the cosmetics.

10. The system of claim 1, wherein the control device is configured to construct a 3D model of the face from the depth image output, extract features of the face, match the features to the face profile, generate robot motion planning from the face profile, and output the motion planning to the robot to apply cosmetics on the face.

11. The system of claim 10, wherein the control device is further configured to operate at time intervals that will permit motion of the face without misapplication of the cosmetics on the face.

12. The system of claim 10, wherein the control device is further configured to extract the robot position at time intervals that will permit motion of the face without misapplication of the cosmetics on the face.

13. A method performed in a control device of controlling a robot that applies cosmetics to a face, comprising the steps of:

(a) receiving a face profile;
(b) receiving a depth sensor input representing spatial varying incoherent light reflected from a face;
(c) extracting a plurality of features of the face from the depth sensor input;
(d) matching the face profile of step (a) to the features of step (c);
(e) generating robot trajectory based on step (d); and
(f) outputting the robot trajectory to the robot to apply the cosmetics.

14. The method of claim 13, wherein each of the face profiles includes a 3D model that represents the face and a cosmetics design that assigns at least one color value to the 3D model.

15. The method of claim 13, further comprising displaying user selectable cosmetics designs to apply the cosmetics.

16. The method of claim 13, further comprising extracting a robot position with respect to the face from the depth sensor input.

17. The method of claim 16, further comprising repeating steps (b) to (f).

18. A method performed in a control device of displaying guides that applies cosmetics to a face by hand, comprising the steps of:
(a) receiving a face profile;
(b) receiving a depth sensor input representing incoherent light reflected from a face;
(c) extracting a plurality of features of the face;
(d) matching the face profile of step (a) to the features of step (c);
(e) generating guides to apply cosmetics; and
(f) outputting the guides on face to a display.

19. The method of claim 18, wherein each of the face profiles includes a 3D model that represents the face and a cosmetics design that assigns at least one color value to the 3D model.

20. The method of claim 18, further comprising displaying user selectable cosmetics applicators.

* * * * *